United States Patent [19]
Ogata et al.

[11] Patent Number: 5,926,791
[45] Date of Patent: Jul. 20, 1999

[54] RECURSIVELY SPLITTING THE LOW-FREQUENCY BAND WITH SUCCESSIVELY FEWER FILTER TAPS IN METHODS AND APPARATUSES FOR SUB-BAND ENCODING, DECODING, AND ENCODING AND DECODING

[75] Inventors: Masami Ogata, Kanagawa; Teruhiko Suzuki, Chiba; Tak Yen Tong, Tokyo, all of Japan

[73] Assignee: Sony Corporation, Tokyo, Japan

[21] Appl. No.: 08/736,082

[22] Filed: Oct. 24, 1996

[30] Foreign Application Priority Data

Oct. 26, 1995 [JP] Japan .................................. 7-279424

[51] Int. Cl.[6] .............................. G06K 9/00; H04N 7/24
[52] U.S. Cl. ...................... 704/500; 704/205; 382/240; 382/248; 348/398
[58] Field of Search ...................... 348/398; 364/724.14, 364/725.01; 382/239, 240, 248, 260, 265; 704/205, 227, 500, 501, 502

[56] References Cited

U.S. PATENT DOCUMENTS

| | | |
|---|---|---|
| 4,184,129 | 1/1980 | Macchi Ne Danjon et al. ......... 333/18 |
| 4,896,356 | 1/1990 | Millar ....................................... 704/205 |
| 5,115,240 | 5/1992 | Fujiwara et al. .......................... 341/51 |
| 5,148,498 | 9/1992 | Resnikoff et al. ....................... 382/248 |
| 5,272,656 | 12/1993 | Genereux ............................. 364/724.19 |
| 5,420,636 | 5/1995 | Kojima .................................... 348/403 |
| 5,442,399 | 8/1995 | Asamura et al. ........................ 348/394 |
| 5,451,954 | 9/1995 | Davis et al. ............................. 341/200 |
| 5,537,493 | 7/1996 | Wilkinson ............................... 382/240 |
| 5,696,708 | 12/1997 | Leung .................................... 364/724.1 |

FOREIGN PATENT DOCUMENTS 0 642 272 A2  3/1995  European Pat. Off. ......... H04N 7/24

*Primary Examiner*—David R. Hudspeth
*Assistant Examiner*—Donald L. Storm
*Attorney, Agent, or Firm*—Frommer Lawrence & Haug, LLP; William S. Frommer; Dennis M. Smid

[57] ABSTRACT

A sub-band encoding method for splitting the frequency spectrum of an input signal into plural bands, encoding the signals of the respective bands and transmitting the encoded signal, is disclosed. The encoding method includes a first step of splitting the input signal into a signal of a high frequency band and a signal of a low frequency band using a first-stage low-pass filter and a first-stage high-pass filter, a second step of downsampling signals of respective frequency bands obtained by the first step, a third step of splitting the frequency spectrum of the low frequency band signal downsampled by the second step, using recursively a pre-set low-pass filter and a high-pass filter, for generating signals of a plurality of frequency bands, and a fourth step of encoding the signals of respective frequency bands obtained by the second step and the third step. The number of taps of the second-stage low-pass filter and the second-stage high-pass filter used in the third step is set so as to be smaller than the number of taps of the first-stage low-pass filter and the first-stage low-pass filter. In the case of splitting the frequency spectrum of a two-dimensional picture signal, the method may include high pass and low pass filtering at each stage in both horizontal and vertical directions, and the relationship involving the number of taps at each stage may be similar.

24 Claims, 10 Drawing Sheets

RECURSIVELY SPLITTING THE LOW-FREQUENCY BAND WITH SUCCESSIVELY FEWER FILTER TAPS IN METHODS AND APPARATUSES FOR SUB-BAND ENCODING, DECODING, AND ENCODING AND DECODING

BACKGROUND OF THE INVENTION

1. Field of the Invention

This invention relates to a sub-band encoding method and apparatus and a sub-band decoding method and apparatus. More particularly, it relates to an encoding method and apparatus in which digital signals, such as digital audio or video signals, are encoded subsequent to spectrum splitting, and a decoding method and apparatus for decoding the encoded signals.

2. Description of the Related Art

Among the encoding/decoding methods for compressing digital signals, there is a sub-band encoding in which the digital signals are split in frequency by a filter for wavelet transform for compressing the digital signals. That is, sub-band coding filters the input signal by plural filters having different pass bands and down-samples the signal at an interval corresponding to the frequency band for compressing the signal by taking advantage of the energy deviation in the filter output signals.

Discussions on sub-band encoding and signal processing by band splitting employing wavelet transform may be found in Martin Vetterli, "Wavelet Transform and Sub-band Encoding", in Journal of Electronic Information Communication Society, vol.74, No.12, pp 1275 to 1278, December 1991.

In general, wavelet transform is said to be a lower-level concept or improvement of sub-band encoding. In the present invention, the wavelet transform is intended to mean not only the filter for wavelet transform itself but also the techniques employing a filter used for sub-band encoding in general.

FIG. 1 shows a basic arrangement for frequency spectrum splitting and synthesis by a filter for wavelet transform. This figure is the same as that shown in the above publication by M. Vetterli. An input signal is a first-order signal x[i].

A splitting unit 100 is a main part of an encoder, while a synthesis unit 110 is a main part of a decoder. In the splitting unit 100, an analysis low-pass filter (LPF) $101_L$ is an analysis LPF for spectrum splitting, while an analysis high-pass filter (HPF) $101_H$ is an analysis HPF for frequency splitting. By these two filters $101_L$, $101_H$, the input signal x[i] is split into a low-frequency band signal XL[i] and a high-frequency band signal XH[i]. Down-sampling units $102_L$, $102_H$ perform sample-based decimation on the band-split signals XL[i], XH[i] for generating an output signal XL[j], XH[j], as indicated by the equations 1 and 2:

$$XL[j]=XL[i](j=i/2) \quad (1)$$

$$XH[j]=XH[i](j=i/2) \quad (2)$$

In the synthesis unit 110, the sample interval of the signals XL[j], XH[j] from the splitting unit 100 is doubled, at the same time that a sample having a zero value at a center position is inserted, as shown by the equations 3 and 4:

$$XL[i] = XL[j] \quad (i = 2\ j) \quad (3)$$
$$= 0 \quad (i = 2\ j + 1)$$

$$XH[i] = XH[j] \quad (i = 2\ j) \quad (4)$$
$$= 0 \quad (i = 2\ j + 1)$$

A synthesis LPF 112L and a synthesis HPF 112H are an LPF and an HPF for band synthesis and interpolate output signals of the upsampling units $111_L$, $111_H$ for regenerating signals XL[i], XU[i] of the respective frequency bands. The band signals XL[i], XH[i] are summed together by an adder 113 for synthesis for restoring the input signal x[i].

It should be noted that the analysis LPF $101_L$ and the analysis HPF $101_H$ of the splitting unit 100 and the synthesis LPF $112_L$ and the synthesis HPF $112_H$ of the synthesis unit 110 are constructed for completely or approximately satisfying the relation of the equations 5 and 6:

$$H_0(-z)F_0(z)+H_1(-z)F_1(z)=0 \quad (5)$$

$$H_0(z)F_0(z)+H_1(z)F_1(z)=2z^{-L} \quad (6)$$

It is noted that $H_0(z)$, $H_1(z)$, $F_0(z)$, $F_1(z)$ are transfer functions of the analysis LPF $101_L$, analysis HPF $101_H$, synthesis LPF $112_L$ and the synthesis HPF $112_H$, respectively. L is an arbitrary integer. By this constraint condition, it is assured that the output signal X"[i] in the synthesis unit 110 from the adder 113 be completely or approximately coincident with the input signal x[i]. If the above-described splitting and synthesis by wavelet transform are used for encoding, encoding/decoding is carried out between the downsampling units $102_L$, $102_H$ and the upsampling units $111_L$, $111_H$. Although the input signal is split in the example of FIG. 1 into two frequency bands, the respective frequency bands are further recursively split twice or thrice for encoding for more efficient data compression.

FIG. 2 shows the structure of a conventional encoder 120 employing sub-band encoding. In the encoder 120, the input signal x[i] is split by first-stage analysis LPF $121_L$ and analysis HPF $121_H$ into a low-frequency band signal $XL_0[i]$ and a high-frequency band signal $XH_0[i]$. The low-frequency band signal $XL_0[j]$, obtained by the downsampling unit $122_L$ by downsampling in accordance with the equation 1, is further split in frequency by a second-stage analysis LPF $123_L$ and analysis HPF $123_H$. The resulting signals $XL_1[j]$, $XH_1[j]$ are downsampled by downsampling units $124_L$, $124_H$, respectively, for generating a low frequency band signal $XL_1[k]$ and a high frequency band signal $XH_1[k]$.

On the other hand, the high frequency band signal $XH_0[i]$, which has passed through the first-stage analysis HPF $121_H$, is downsampled by the downsampling unit $122_H$. The resulting high-frequency band signal $XH_0[j]$ enters a delay unit 125 for synchronization with the low-frequency band signal $XL_0[j]$. The low frequency range signal $XL_1[k]$ and the high frequency band signal $XH_1[k]$, downsampled by the second-stage downsampling units $124_L$, $124_H$, and the first-stage high-frequency band signal $XH_0[j]$ appropriately delayed by the delay unit 125, enter quantizers 126a, 126b and 126c, respectively, for quantization with quantization steps $QL_1$, $QH_1$ and $QH_0$, respectively, in accordance with the equations 7, 8 and 9:

$$XL_1[k]=XL_1[k]/QL_1 \quad (7)$$

$$XH_1[k]=XH_1[k]/QH_1 \quad (8)$$

$$XH_0[j]=XH_0[j]/QH_0 \quad (9)$$

The quantization steps $QL_1$, $QH_1$ and $QH_0$, are adaptively set in view of, for example, the amount of generated data, data speed on the transmission route or the recording capacity of the recording medium. In general, the quantization step is set so as to be narrower in a direction towards the lower frequency for prohibiting the lowering of the picture quality.

The quantized signals $XL_1'[k]$, $XH_1'[k]$ and $XH_0'[j]$ enter a reversible encoding/multiplexing unit 127 for reversible encoding, such as Huffman encoding or arithmetic encoding, and multiplexing, before being outputted to a recording medium or to a transmission route, not shown.

FIG. 3 shows the structure of a conventional decoder 130 employing sub-band coding. The decoder 130 has a demultiplexer/reversible decoding unit 131 performing decoding which is a reversed operation with respect to the multiplexing and reversible encoding performed by the encoder 120 for restoring the signals $XL_1'[k]$, $XH_1'[k]$ and $XH_0'[j]$. These signals enter dequantizers 132a, 132b, 132c having respective different quantization steps so as to be transformed in accordance with the equations 10, 11 and 12:

$$XL_1''[k] = XL_1'[k]/QL_1 \quad (10)$$

$$XH_1''[k] = XH_1'[k]/QH_1 \quad (11)$$

$$XH0''[j] = XH_0'[j]/QH_0 \quad (12)$$

Of the outputs $XL_1''[k]$, $XH_1''[k]$ and $XH_0''[k]$ of the dequantizers 132a, 132b, 132c, the low frequency band signal $XL_1''[k]$ and the high frequency band signal $XH_1''[k]$ for the second-stage spectrum splitting of the encoder 120 enter upsampling units $133_L$, $133_H$, respectively. The signals obtained by upsampling similar to that performed by the upsampling units $133_L$, $133_H$ in accordance with the equations 3 and 4, respectively, enter a synthesis LPF $134_L$ and a synthesis HPF $134_H$ related with the synthesis LPF $123_L$ and the synthesis HPF $123_H$, respectively, in accordance with the equations 5 and 6, respectively. The low frequency band signal $XL_1''[j]$, $XH_1''[j]$ regenerated by the interpolation by the filters $134_L$, $134_H$, respectively, are summed together by an adder 135 to give a low frequency band signal $XL_0''[j]$ associated with the low frequency band signal $XL_0[j]$ obtained by first-stage spectrum splitting in the encoder 120.

On the other hand, the high frequency band signal $XH_0''[j]$, associated with the first stage spectrum splitting of the first encoder 120, enters a delay unit 136, so as to be delayed by time necessary for reconstructing the low frequency band signal $XL_0''[j]$, associated with the first stage spectrum splitting.

The low frequency band signal $XL_0''[j]$, associated with the first stage spectrum splitting, and the high frequency band signal $XH_0''[j]$, associated with the first stage spectrum splitting, delayed by the delay unit 136, enter upsampling units $137_L$, $137_H$, for upsampling, and are then interpolated by a synthesis LPF $138_L$ and a synthesis HPF $138_H$ for interpolation. The resulting low frequency band signal $XL_0''[i]$ and high frequency band signal $XH_0''[i]$ are summed together by an adder 139 to produce a regenerated signal x"[i] corresponding to the input signal x[i].

In the conventional encoding method based on sub-band coding or wavelet transform, if a finite impulse response filter (FIR) having a large number of taps is used for frequency splitting, the range of ripple generation in the filter inhibiting area becomes wider such that ringing is produced around a picture portion exhibiting significant level changes, such as picture edges. In particular, if spectrum splitting is recursively performed a plurality of number of times, the number of filter taps is relatively increased with an increased number of times of spectrum splitting, as a result of which ringing is produced in a wide range around the picture edge.

Meanwhile, the range of generation of ringing can be decreased by using a filter having a smaller number of taps. However, in such case, the problem is raised that, due to deterioration of low frequency components, step-like changes are produced in the smoothly changing picture portions. This phenomenon is perceived in the picture as block distortion thus increasing deterioration in the picture quality. This problem is raised because the condition for complete reconstruction cannot be met due to quantization of the band-split signal such that aliasing produced on the high-pass filter side and that produced on the low-pass filter side cannot cancel each other. Although there is the problem of aliasing on the high pass filter side, mainly the aliasing on the low pass filter side involves problems since the high range side signals are deteriorated as compared to the low range side signals in encoding. This effect presents itself as ringing in the vicinity of the edge portion where the large level difference exists. In this case, the high range side signal contained by the picture edge is deteriorated such that aliasing on the low pass filter side cannot be canceled. If a filter having a long impulse response time duration is used, a picture area centered about the edge and having a length equal to the edge length is affected, thus causing deterioration of the high frequency components. If a filter having a short impulse response time duration is used, the range of generation of ringing is diminished, however, the passband on the filter frequency area becomes wider thus elongating the passband of the high pass filter towards the low frequency side. That is, deterioration on the high frequency side affects the low-frequency components, thus producing a block-like noise in the smoothly changing picture area. That is, low frequency components are deteriorated.

Briefly, the above problem is that of trade-off between the time domain and the frequency domain in the indeterminacy principle, such that, if resolution in the time domain is raised, that is the frequency domain is lowered.

The number of taps in a low-pass filter or a high-pass filter corresponds to duration in the time domain, so that, if the duration is shorter, that is if time resolution is higher, the resolution in the frequency domain is lowered, thus demonstrating the aliasing effect.

Moreover, the aliasing is produced by downsampling following filtering, such that aliasing is produced at the time point of downsampling following the filtering for spectrum splitting. If synthesis is performed without quantization, aliasing contained in the passbands of the low-pass filter and the high-pass filter should theoretically be canceled. However, since quantization is done for signal compression, aliasing cannot be canceled by synthesis.

Meanwhile, the number of filter taps means the number of filter coefficients or the length or span of a filter. The large number of filter taps is synonymous with the long length or span of the filter.

SUMMARY OF THE INVENTION

It is therefore an object of the present invention to provide a sub-band encoding method and apparatus whereby, when encoding an input signal by sub-band coding, the range of generation of ringing can be reduced as compared to that with the conventional method or apparatus.

According to the present invention, when a number of times of band splitting or wavelet transform are performed by subband encoding, the filtering is performed on the signal with a smaller number of taps the larger the number of times of band splitting so far performed on the signal. That is, a filter having a larger number of taps is used at an initial stage of band splitting for avoiding the appearance of a step-shaped pattern due to deterioration of low-frequency components. With increased number of times of band splitting, the filter with a smaller number of taps is used for preventing the relative increase in the number of taps due to downsampling, while suppressing a range of picture ringing to a smaller value.

DESCRIPTION OF THE PREFERRED EMBODIMENTS

Figure 4:
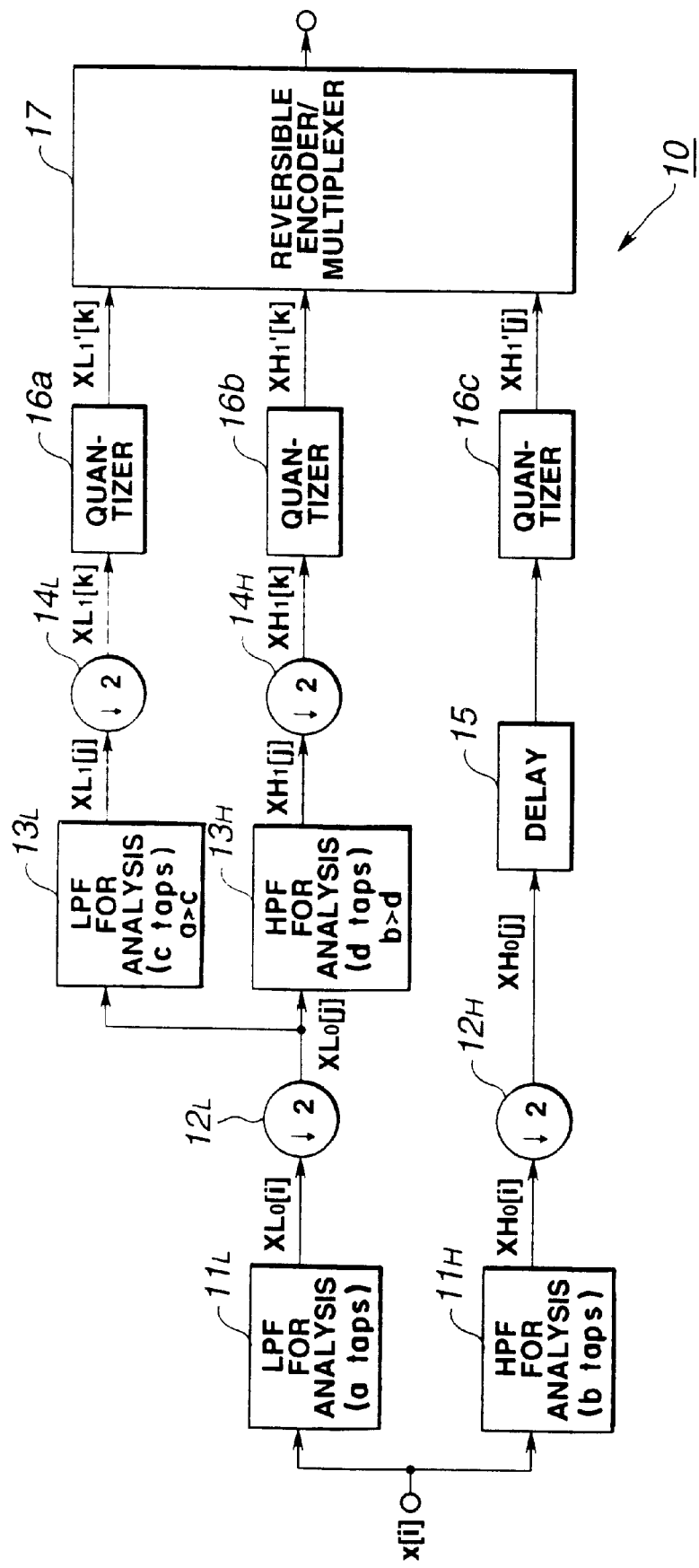
FIG. 4 is a block diagram showing a specified arrangement of a sub-band encoder according to the present invention.

FIG. 4 shows a specified structure of a sub-band encoder employing wavelet transform according to the present invention.

Referring to FIG. 4, the present encoder includes a first-stage analysis low-pass filter (LPF) $11_L$ for spectrum-splitting an input signal x[i] into, for example, a low frequency band signal $XL_0[i]$ and a high frequency band signal $XH_0[i]$ and downsampling units $12_L$, $12_H$ for down-sampling the low frequency band signal $XL_0[i]$ and the high frequency band signal $XH_0[i]$. The encoder also includes a second-stage analysis LPF $13_L$ and a second-stage analysis HPF $13_H$ for splitting a low frequency band signal $XL_0[j]$ from the downsampling unit $12_L$ into a low frequency band signal $XL_1[j]$ and a high frequency band signal $XH_1[j]$, and downsampling units $14_L$, $14_H$ for down-sampling the low frequency band signal $XL_1[j]$ and a high frequency band signal $XH_1[j]$, respectively. The encoder further includes quantizers 16a, 16b and 16c for quantizing a low frequency band signal $XL_1[k]$ and a high frequency band signal $XH_1[k]$ from the downsampling units $14_L$, $14_H$ and a high frequency band signal $XH_0[j]$ from the downsampling unit $12_H$ and a reversible encoding/multiplexing unit 17 for encoding the quantized $XL_1'[k]$, $XH_1'[k]$ and $XH_0'[j]$ in accordance with a pre-set encoding rule.

The first stage analysis LPF $11_L$ and HPF $11_H$ are filters for wavelet transform for band-splitting the input signal x[i]. Specifically, the analysis LPF $11_L$ allows passage of the high frequency band signal $XH_0[i]$, which is a low frequency component of the input signal x[i], and sends the high frequency band signal $XH_0[i]$ to the downsampling unit $12_H$.

The downsampling unit $12_L$ downsamples the low frequency band signal $XL_1[i]$ by decimating every other sample as shown by the equation 1 explained in connection with the prior art, and routes the downsampled low frequency band signal $XL_0[j]$ to the analysis LPF $13_L$ and the analysis HPF $13_H$. The downsampling unit $12_H$ downsamples the high frequency band signal $XH_0[i]$ based on the equation 2 explained in connection with the prior art, and routes the downsampled high frequency band signal $XH_0[j]$ to a delay unit 15.

The second-stage analysis LPF $13_L$ and the second-stage analysis HPF $13_H$ are also filters for wavelet transform and further frequency splits the low frequency band signal $XL_0[j]$ supplied from the downsampling unit $12_L$. Specifically, the analysis LPF $13_L$ allows passage of the low frequency band signal $XL_1[j]$, which is a low frequency component of the low frequency band signal $XL_0[j]$. And HPF $13_H$ sends the high frequency band signal $XL_0[j]$ to the downsampling unit $14_L$.

The downsampling unit $14_L$ downsamples the low frequency band signal $XL_1[j]$ supplied from the analysis LPF $13_L$ and routes the downsampled low frequency band signal $XL_1[k]$ to the quantizer 16a. The downsampling unit $14_H$ downsamples the high frequency band signal $XH_1[j]$ supplied from the analysis HPF $13_H$ and routes the downsampled high frequency band signal $XH_1[k]$ to the quantizer 16b.

The delay unit 15 has a pre-set delay time equal to the signal processing time required in the analysis LPF $13_L$ and the downsampling unit $14_L$ and, for synchronizing the high frequency band signal $XH_0[j]$ from the first downsampling unit $12_H$ with the low frequency band signal $XL_1[k]$ and the high frequency band signal $XH_1[k]$ from the second stage downsampling units $14_L$, $14_H$, delays the high frequency band signal $XH_0[j]$ for a pre-set time and sends the delayed signal to the quantizer 16c.

The quantizers 16a, 16b, 16c have quantization steps of $QL_1$, $QH_1$ and $QH_0$, and quantizes the low frequency band signal $XL_1[k]$, high frequency band signal $XH_0[j]$ and the high frequency band signal $XH_0[j]$ in accordance with the equations 7, 8 and 9 explained in connection with the prior art and route the quantized signals $XL_1'[k]$, $XH_1'[k]$ and $XH_0'[j]$ to the reversible encoding/multiplexing unit 17. The quantization steps of $QL_1$, $QH_1$ and $QH_0$ are appropriately set in consideration of, for example, the amount of generated data, data speed on the transmission route or the recording capacity of the recording medium. In general, the quantization step is set so as to be narrower in a direction towards the lower frequency.

The reversible encoding/multiplexing unit 17 has a reversible encoding unit, such as an encoder unit for Huffman encoding, run-length encoding or arithmetic encoding, and variable-length encodes the signals $XL_1'[k]$, $KH_1'[k]$ and $XH_0'[j]$ supplied from the quantizers 16a, 16b and 16c, while multiplexing the variable length encoded signals, for sending the resulting signals as the encoded signals to a recording medium or over a transmission route, not shown.

Figure 1:
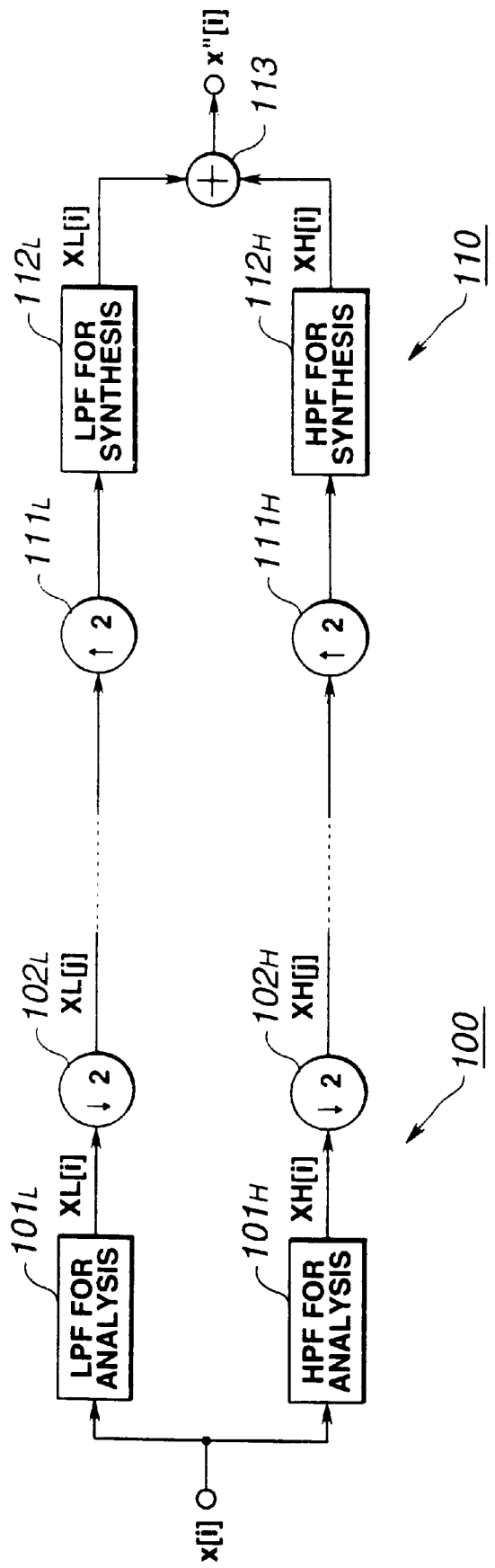
FIG. 1 illustrates the principle of wavelet transform.
Figure 2:
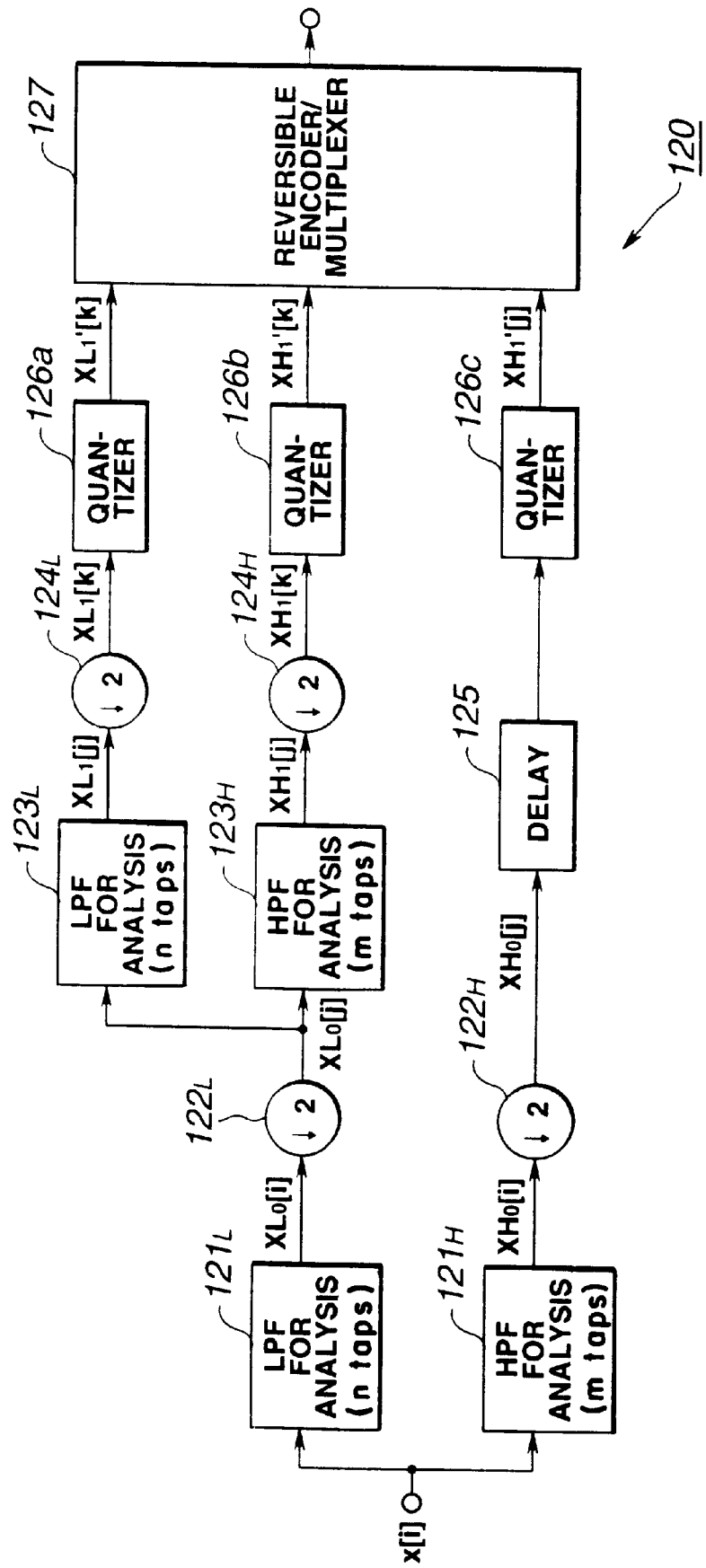
FIG. 2 illustrates the structure of a conventional sub-band encoder.

That is, when frequency-splitting and encoding the input signal by the analysis LPF or the analysis HPF for encoding by the present sub-band encoder, the low frequency band signal, resulting from spectrum splitting, is repeatedly spectrum-split using the analysis LPF and the analysis HPF for raising the frequency resolution of the low-frequency band signal by wavelet transform. Thus the sub-band encoder employing the present invention has its basic structure identical with the conventional apparatus shown in FIG. 2. The feature of the sub-band encoder employing the present invention resides in that the filter for wavelet transform used in the second stage differs in the number of filter taps from the filter for wavelet transform used in the first stage.

Specifically, the first stage uses an LPF and an HPF having coefficients as shown in Tables 1 and 2 as the analysis LPF $11_L$ and the analysis HPF $11_H$.

TABLE 1

| tap numbers | coefficients |
| --- | --- |
| 0 | 0.046875 |
| 1 | −0.093750 |
| 2 | −0.250000 |
| 3 | 0.593750 |
| 4 | 1.406250 |
| 5 | 0.593750 |
| 6 | −0.250000 |
| 7 | −0.093750 |
| 8 | 0.046875 |

TABLE 2

| tap number | coefficients |
| --- | --- |
| 0 | 0.500000 |
| 1 | −1.000000 |
| 2 | 0.500000 |

In the second stage, an LPF and an HPF having smaller number of taps, as shown in Tables 3 and 4, are used as the analysis LPF $11_L$ and the analysis HPF $11_H$ (Haar transform).

TABLE 3

| tap number | coefficients |
| --- | --- |
| 0 | 1.000000 |
| 1 | 1.000000 |

TABLE 4

| tap number | coefficients |
| --- | --- |
| 0 | 1.000000 |
| 1 | −1.000000 |

Meanwhile, the number of filter taps means the number of filter coefficients or the length or span of a filter. The large number of filter taps is synonymous with the long length or span of the filter.

In the present embodiment, linear phase FIR filters are used in both the first and second stages because phase deviation is not incurred on frequency spectrum splitting in a manner meritorious in applying the run length encoding to the wavelet transform coefficient tree which will be explained subsequently.

As will be clear from the foregoing description, the number of taps of the filter for wavelet transform is decreased in the present invention as the number of stages of the frequency spectrum splitting is increased when repeatedly splitting the low-range side signal. The result is that the problem of relative increase in the number of filter taps for low range signals raised in the conventional encoder can be eliminated to prevent ringing from being produced in a wide range around the picture edge.

Figure 5:
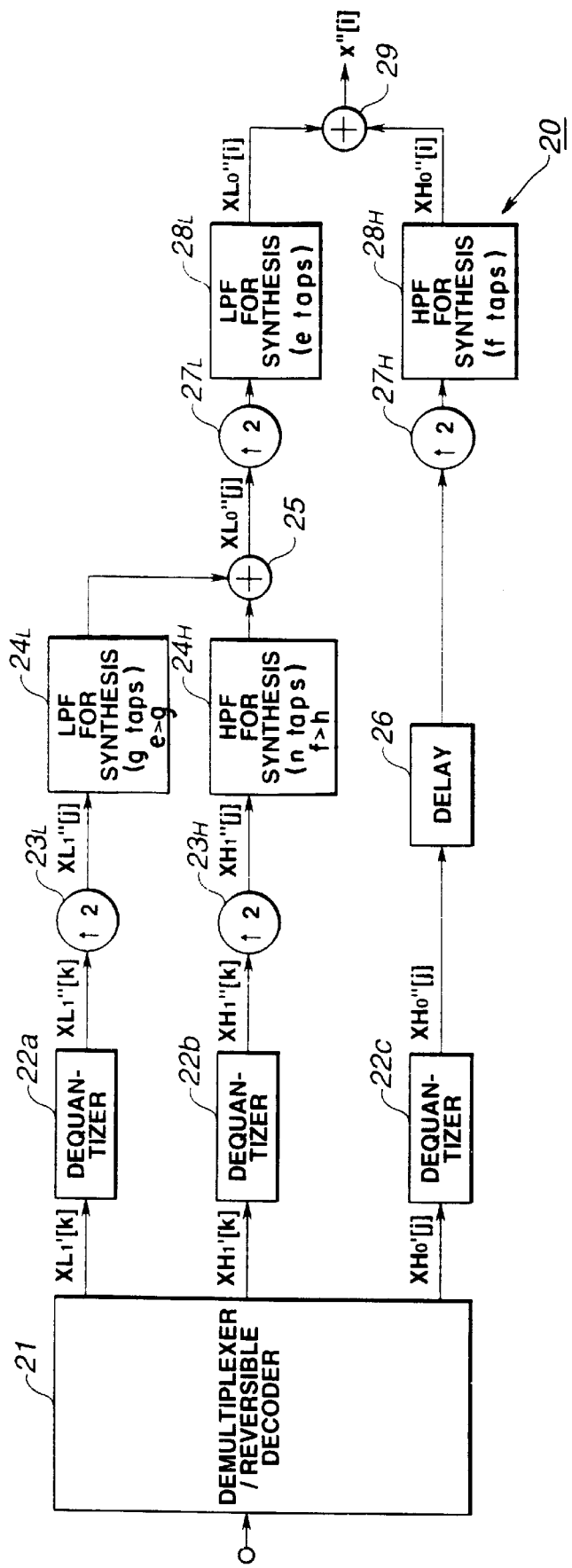
FIG. 5 is a block diagram showing a specified arrangement of a sub-band decoder according to the present invention.

A sub-band decoder according to the present invention is now explained. FIG. 5 shows a specified structure of the present sub-band decoder.

Referring to FIG. 5, the sub-band decoder includes a demultiplexing/reversible decoding unit 21 for decoding transmitted encoded signals, and dequantizers 22a, 22b, 22c for dequantizing low frequency band signal $XL_1'[k]$, a high frequency band signal $XH_1'[k]$ and a high frequency band signal $XH_0'[j]$ from the demultiplexing/reversible decoding unit 21. The sub-band decoder also includes upsampling units $23_L$, $23_H$ for upsampling the dequantized signals $XL_1''[k]$, $XH_1''[k]$, and second-stage synthesis filters LPF $24_L$ and HPF $24_H$ for interpolating the upsampled signals. The sub-band decoder also includes an adder 25 for adding the low frequency band signal $XL_1''[k]$ from the synthesis LPF $24_L$ to the high frequency band signals $XH_1'[k]$ from the synthesis HPF $24_H$, and upsampling units $27_L$, $27_H$ for upsampling the low frequency band signal $XL_1''[k]$ from the adder 25 and the high frequency band signal $XH_0''[j]$ from the dequantizer 22c. The sub-band decoder further includes first-stage synthesis LPF $28_L$ and HPF $28_H$ for interpolating the signals from the upsampling units $27_L$, $27_H$ and an adder 29 for summing a low frequency band signal $XL_1''[k]$ from the synthesis LPF $28_L$ to the high frequency band signal $XH_0''[k]$ from the synthesis HPF $28_H$.

The demultiplexing/reversible decoding unit 21 performs an operation which is the reverse of the operation performed by the reversible encoding/multiplexing unit 17 on the encoded signals directly transmitted from the sub-band encoder 10 or reproduced from the recording medium for reproducing the low frequency band signals $XL_1'[k]$, high frequency band signals $XH_1'[k]$ and high frequency band signals $XH_1'[j]$ in the sub-band encoder 10 for supplying these signals to the dequantizers 22a, 22b and 22c.

The dequantizers 22a, 22b and 22c own quantization steps of $QL_1$, $QH_1$ and $QH_0$ owned by the quantizers 16a, 16b and 16c of the sub-band encoder, respectively, and execute the processing operations of the equations 10, 11 and 12, explained in connection with the prior art example, respectively. The dequantizers 22a, 22b send the low frequency band signal $XL_1''[k]$ and the high frequency band signal $XH_1''[k]$, associated with the second-stage band splitting of the subband encoder 10, to the upsampling units $23_L$, $23_H$, respectively. The dequantizer 22c sends the high frequency band signals $XH_0'''[j]$ associated with the first-stage frequency splitting of the sub-band encoding unit 10 to the delay unit 26.

The upsampling units $23_L$, $23_H$ double the sampling interval and insert a sample having a zero value at the center position of each sample in accordance with the equations 3 and 4 of the prior art example and send the resulting signal to the second stage synthesis LPF $24_L$ and HPF $24_H$, respectively.

The synthesis LPF $24_L$ and HPF $24_H$ are filters related with the analysis LPF $13_L$ and analysis HPF $13_H$ of the sub-band encoder 10, respectively, by the following equations 13 and 14:

$$H_0(-z)F_0(z)+H_1(-z)F_1(z)=0 \quad (13)$$

$$H_0(z)F_0(z)+H_1(z)F_1(z)=2z^{-L} \quad (14)$$

These synthesis filters interpolate signals from the upsampling units $23_L$, $23_H$ to reproduce the low frequency band signal XL$_1$"[j] and the high frequency band signal XH$_1$"[j] corresponding to the second-stage band splitting of the subband encoder 10 and route the reproduced signals to the adder 25. It is noted that H$_0$(z), H$_1$(z), F$_0$(z), F$_1$(z) are transfer functions of the analysis LPF 13$_L$ and the analysis HPF 13$_H$ and the synthesis LPF 24$_L$ and the synthesis HPF 24$_H$, respectively.

The adder 25 sums the low frequency band signals XL$_1$"[j] and the high frequency band signals XH$_1$"[j] to each other for synthesis and routes the resulting low frequency band signal XL$_0$"[j] to the upsampling unit 27$_L$. The low frequency band signal XL$_0$"[j] correspond to the first stage spectrum splitting of the sub-band encoder 10.

The delay unit 26 has a pre-set delay time equal to the signal processing time by, for example, the upsampling unit 23$_L$ and the synthesis LPF 24$_L$. The delay unit delays the high frequency band signals XH$_0$"[j] a pre-set time for synchronization with the low frequency band signal XL$_0$"[j] from the adder 25 and routes the resulting signal to the upsampling unit 27$_H$. The high frequency band signals XH$_0$"[j] is supplied from the dequantizer 22c and associated with the first stage spectrum splitting of the sub-band encoder 10.

The upsampling units 27$_L$, 27$_H$ double the sampling interval and insert a sample having a zero value at the center position of each sample to send the resulting signal to the second stage synthesis LPF 28$_L$ and HPF 28$_H$, respectively.

The synthesis LPF 28$_L$ and HPF 28$_H$ are filters related with the analysis LPF 11$_L$ and analysis HPF 11$_H$ of the sub-band encoder 10, respectively, by the above equations 13 and 14, respectively. The synthesis LPF 28$_L$ and HPL 28$_H$ interpolate the signals from the upsampling units 27$_L$, 27$_H$, respectively, and route the low frequency band signals XL$_0$"[i] and the high frequency band signals XH$_0$"[i] associated with the first stage spectrum splitting of the sub-band encoder 10 to the adder 29.

The adder 29 sum these low frequency band signals XL$_0$"[i] and high frequency band signals XH$_0$"[i] for synthesis and regenerate a signal x"[i] corresponding to the input signal x[i].

Figure 3:
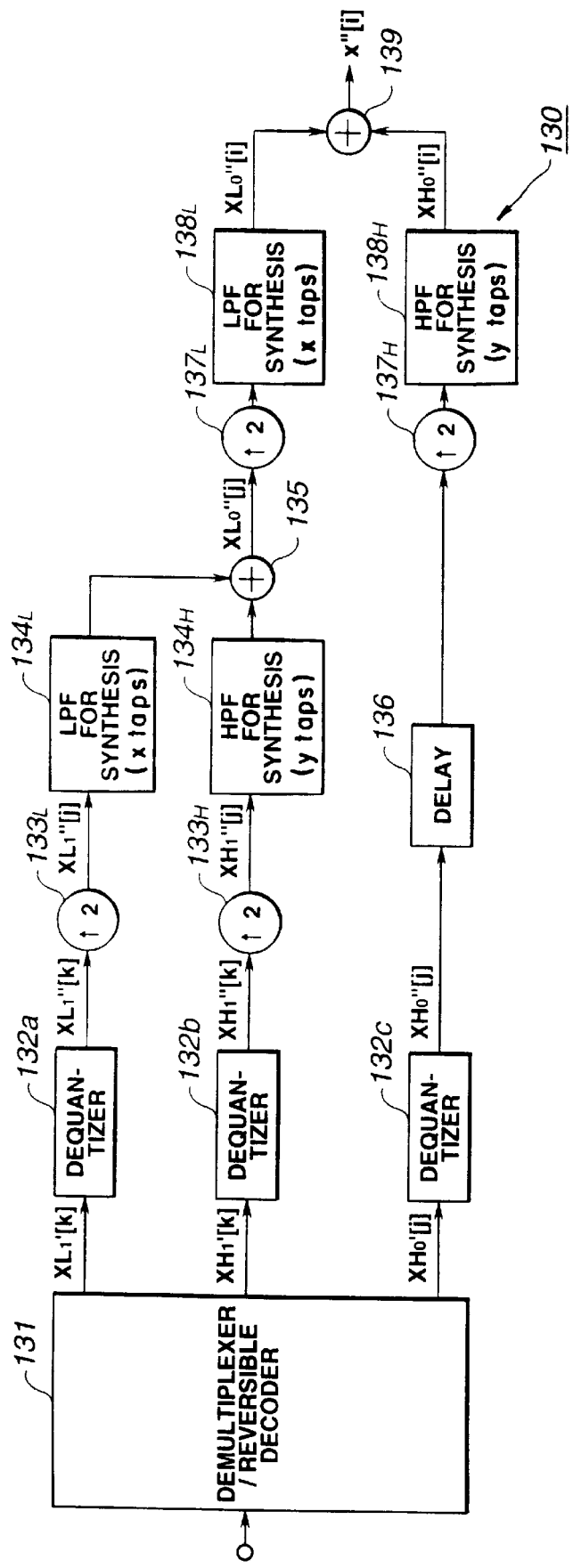
FIG. 3 illustrates the structure of a conventional sub-band decoder.

Thus the present sub-band decoder employing wavelet transform has its basic structure identical with the conventional apparatus shown in FIG. 3. The feature of the present sub-band encoder resides in that the filters for wavelet transform used in the second stage (synthesis LPF 24$_L$ and synthesis filter HPF 24$_H$) differ in the number of filter taps from the filters for wavelet transform used in the first stage (synthesis LPF 28$_L$ and synthesis filter HPF 28$_H$).

Specifically, the first stage uses an LPF and an HPF having coefficients as shown in Tables 5 and 6 as the synthesis LPF 28$_L$ and the synthesis HPF 28$_H$, respectively.

TABLE 5

| tap number | coefficients |
| --- | --- |
| 0 | 0.250000 |
| 1 | 0.500000 |
| 2 | 0.250000 |

TABLE 6

| tap number | coefficients |
| --- | --- |
| 0 | -0.023438 |
| 1 | -0.46875 |
| 2 | 0.125000 |

TABLE 6-continued

| tap number | coefficients |
| --- | --- |
| 3 | 0.296875 |
| 4 | -0.703125 |
| 5 | 0.296875 |
| 6 | 0.125000 |
| 7 | -0.046875 |
| 8 | -0.023438 |

TABLE 7

| tap number | coefficients |
| --- | --- |
| 0 | 0.500000 |
| 1 | 0.500000 |

TABLE 8

| tap number | coefficients |
| --- | --- |
| 0 | -0.500000 |
| 1 | 0.500000 |

In the second stage, an LPF and an HPF having smaller number of taps, as shown in Tables 7 and 8, are used as the synthesis LPF 24$_L$ and the synthesis HPF 24$_H$, respectively.

It should be noted that representation for the first and second stages is based on the encoder side without being based on signal flow. These filters individually have so far been used and meet the relation of the equations 13 and 14. Although recursive spectrum splitting is repeated twice in the present embodiment for the low frequency band signal, the manner and the number of times of spectrum splitting are not limited to those shown in the above embodiment. The present invention can be applied to other spectrum splitting methods or to other number of times of spectrum splitting.

In other terms, the number of taps of the (n−1)th stage filter in the signal flow is set so as to be smaller than that of the final nth filter next to the (n−1)th filter when decoding the signals encoded by the sub-band encoding, while the number of taps of the (n−2)st stage filter is set so as to be smaller than that of the (n−1)st stage filter. This prevents ringing from being produced over a wide range around the picture edge.

Figure 6:
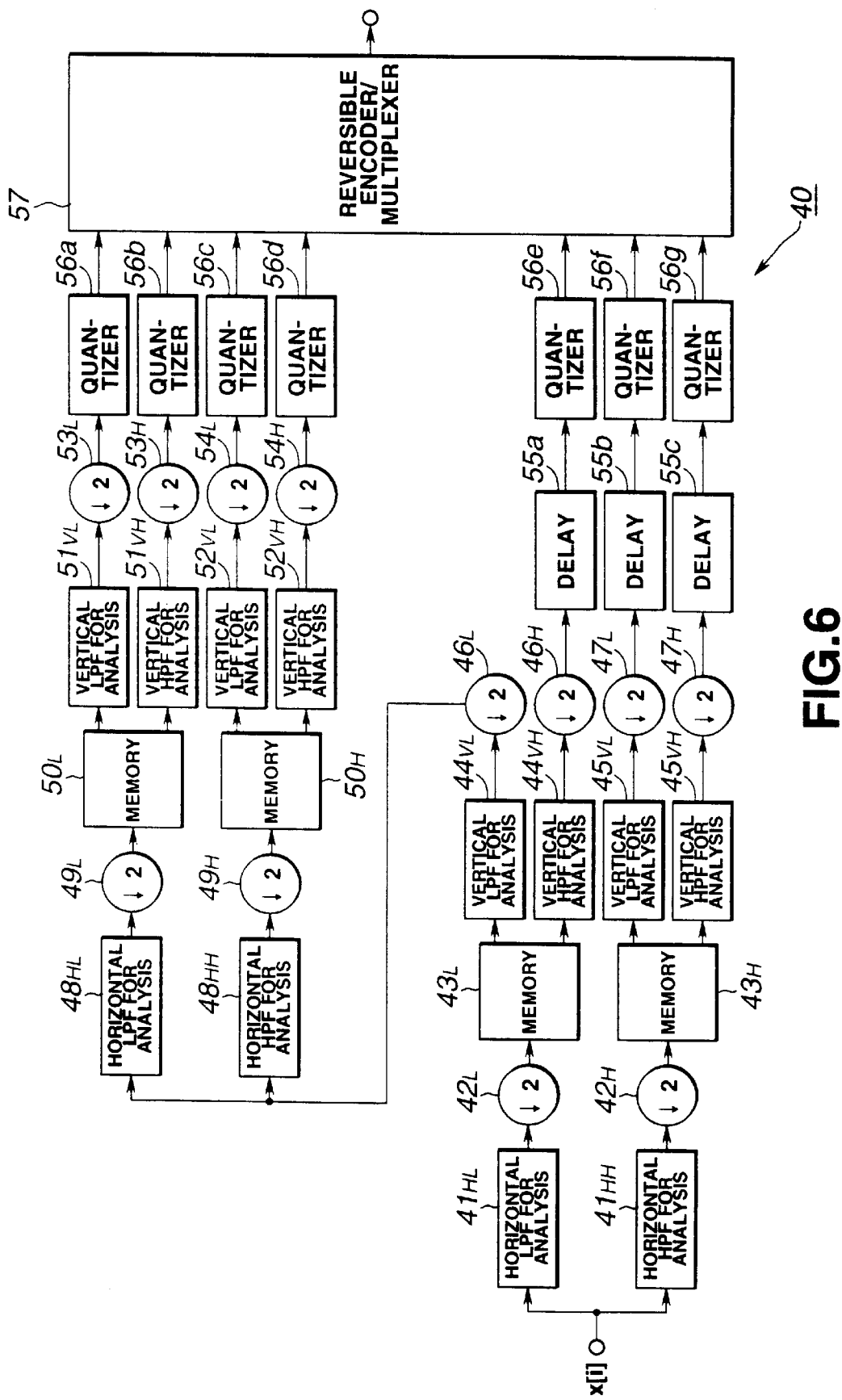
FIG. 6 is a block diagram showing a specified structure of the sub-band encoder according to the present invention.
Figure 7:
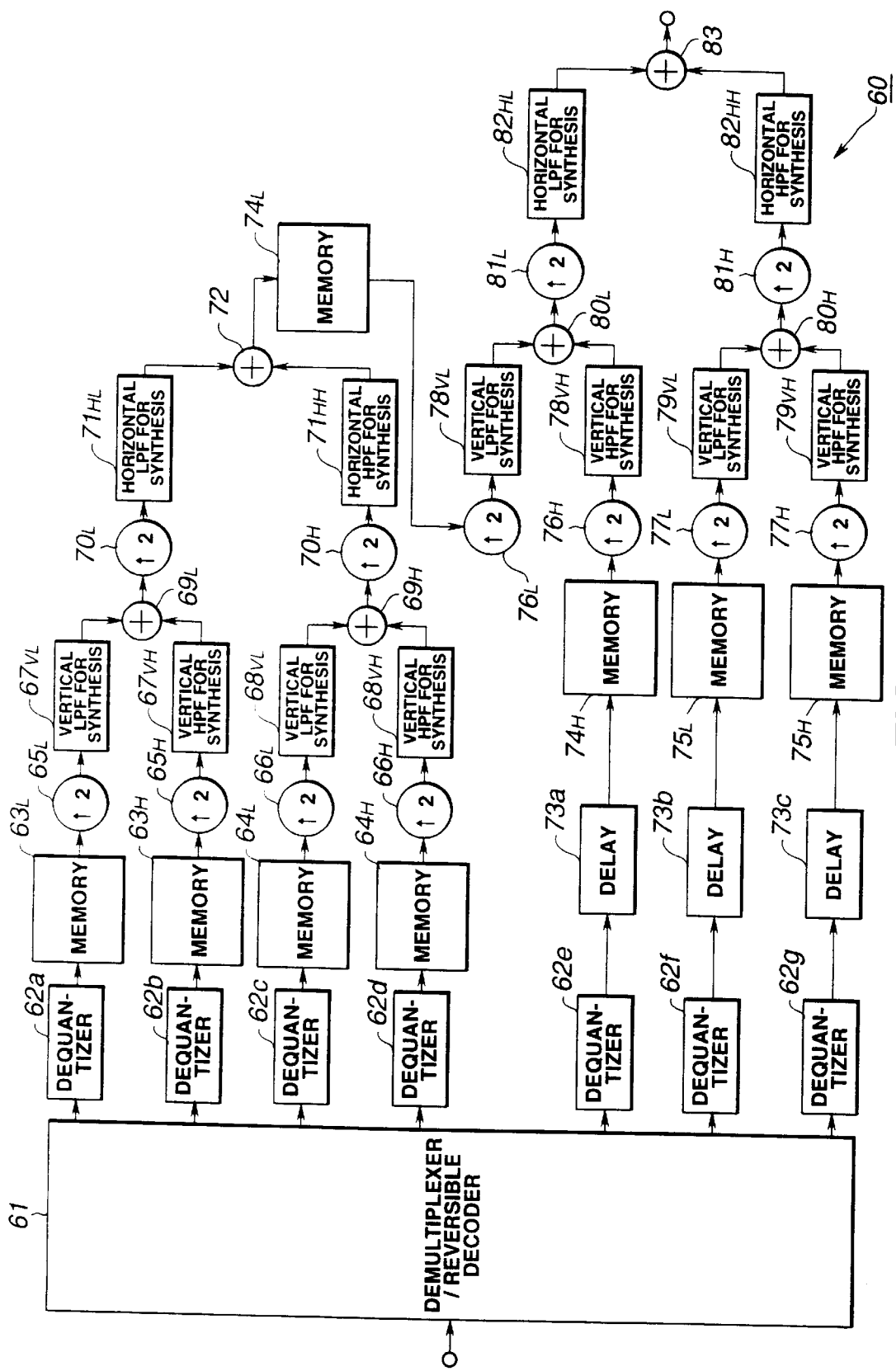
FIG. 7 is a block diagram showing a specified structure of the sub-band decoder according to the present invention.

FIGS. 6, 7 illustrate a specified structure of a sub-band encoder and a sub-band decoder in case the present invention is applied to a two-dimensional picture.

Figure 8:
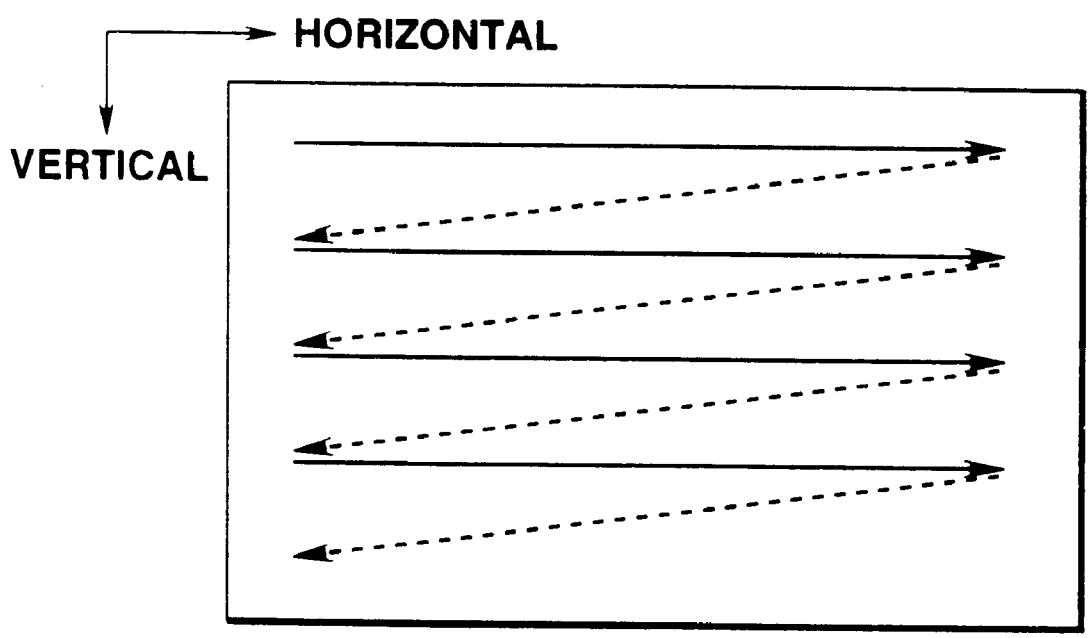
FIG. 8 illustrates the scanning direction for encoding a two-dimensional picture signal.

The sub-band encoder and the sub-band decoder are basically the same in structure as the sub-band encoder and the sub-band decoder shown in FIGS. 4 and 5. However, the input signal x[i] is a picture signal obtained on scanning a two-dimensional picture in a sequence shown in FIG. 8. Also, in the encoder and the decoder, four filtering operations, namely low-pass filtering and high-pass filtering in the horizontal direction and low-pass filtering and high-pass filtering in the vertical direction are performed in the spectrum splitting of the respective stages of the sub-band encoder for spectrum splitting the picture in each stage of the sub-band encoder.

Referring more specifically to FIG. 6, the sub-band encoder 40 includes, for first stage spectrum splitting, a first stage analysis horizontal LPF 41$_{HL}$ and a first stage analysis horizontal HPF 41$_{HH}$ for splitting the input signal x[i] in the horizontal direction into a low frequency band signal and a high frequency band signal, and downsampling units 42$_L$, $42_H$ for downsampling these low frequency band signal and the high frequency band signal. The sub-band encoder 40 also includes memories 43L, 43H for transiently storing the low frequency band signal and the high frequency band signal from the downsampling units $42_L$, $42_H$. The sub-band encoder 40 also includes first-stage analysis vertical LPF $44_{VL}$, analysis vertical HPF $44_{VH}$, analysis vertical LPF $45_{VL}$ and analysis vertical HPF $45_{VH}$, for splitting the low frequency band signal and the high frequency band signal read out in the sequential vertical direction from the memories $43_L$, $43_H$ further into low frequency band signal and high frequency band signal. The sub-band decoder further includes downsampling units $46_L$, $46_H$, $47_L$ and $47_H$.

The downsampling unit $46_L$ outputs low frequency band signals of which both the horizontal and vertical directions belong to the low frequency band, while the downsampling unit $46_H$ outputs high frequency band signals of which the horizontal direction belongs to the high frequency band and the vertical direction belongs to the high frequency band. The downsampling unit $47_L$ outputs high frequency band signals of which the horizontal direction belongs to the high frequency band and the vertical direction belongs to the low frequency band, while the downsampling unit $47_H$ outputs high frequency band signals of which both the horizontal and vertical directions belong to the high frequency band. Meanwhile, the operation of the first-stage analysis horizontal LPF $41_{HL}$ to the analysis vertical HPF $45_{VH}$ is the same as that of the analysis LPF $11_L$ and the analysis HPF $11_H$, shown in FIG. 4, detailed description of the operation of the respective circuits is not made for simplicity. Meanwhile, the downsampling units $46_L$ to $47_H$ perform downsampling in the vertical direction of the picture by decimating every other line. The memories $43_L$, $43_H$ are line memories for transiently storing signals of a necessary number of lines for down-sampling the low frequency band signals and the high frequency band signals in the vertical direction of the picture. These low frequency band signals and the high frequency band signals are supplied with horizontal picture sampling from the first stage analysis horizontal LPF $41_{HL}$ and analysis horizontal HPF $41_{HF}$.

Referring to FIG. 6, the sub-band encoder 40 includes second-stage analysis horizontal LPF $48_{HL}$ and analysis horizontal HPF $48_{HH}$ for splitting the low frequency band signals from the downsampling unit $46_L$, the horizontal and vertical directions of which both belong to the low frequency band, into low frequency band signals and high frequency band signals in the horizontal direction. The sub-band encoder 40 also includes downsampling units $49_L$, $49_H$ for downsampling these low frequency band signals and high frequency band signals and memories $50_L$, $50_H$ for transiently storing the low frequency band signals and high frequency band signals from the downsampling units $49_L$, $49_H$. The sub-band encoder 40 also includes second stage analysis vertical LPF $51_{VL}$, analysis vertical HPF $51_{VH}$, analysis vertical LPF $52_{VL}$ and analysis vertical HPF $52_{VH}$ for further splitting the low frequency band signals and high frequency band signals read out in the vertical direction from the memories $50_L$, $50_H$. The sub-band encoder 40 further includes downsampling units $53_L$, $53_H$, $54_L$, $54_H$ for downsampling the signals from these filters.

In the second stage analysis, the low frequency band signals, obtained by first stage spectrum splitting (wavelet transform) and the horizonal and vertical directions of which both belong to the low frequency range, are further split in two frequency bands in both the horizontal and vertical directions and outputted. The operation of the second stage analysis horizontal LPF $48_{PL}$ to the analysis vertical HPF $52_{VH}$ is the same as the operation of the analysis LPF $13_L$ and analysis HPF $13_H$ shown in FIG. 4 and hence the detailed operation of the respective circuits is not made for simplicity.

The LPFs and HPFs of the same stage can have the same filter tap coefficients. Specifically, the analysis horizontal HPF $41_{HL}$, analysis vertical LPF $44_{VL}$ and $45_{VL}$ use tap coefficients shown in table 1, while the analysis horizontal HPF $41_{HH}$, analysis vertical LPF $44_{VH}$ and $45_{VH}$ use tap coefficients shown in table 2. The analysis vertical LPF $48_{HL}$, vertical horizontal LPF $51_{VL}$ and $52_{VL}$ used for spectrum splitting of the second state use tap coefficients shown in table 3, while the analysis horizontal HPF $48_{HH}$, analysis vertical LPF $51_{VH}$ and $52_{VH}$ use tap coefficients shown in table 4.

That is, with the present sub-band encoding, as the number of stages is increased from one to two, three, or higher, the number of taps (number of orders) of the filters for wavelet transform of the respective stages is decreased, as a result of which the number of filter taps (number of stages) can be prevented from being increased for the lowermost band signals, which are most critical signals, thus preventing ringing from being produced over a wide area around picture edges.

Since the present sub-band encoder encodes the two-dimensional picture signals using two-stage wavelet transform, seven quantizers 56a to 56g and a reversible encoding/multiplexing unit 57 are used, as shown in FIG. 6.

The quantizers 56a to 56g quantize signals of the split bands using quantization steps which become finer towards the lower band side, and route the quantized signals to the reversible encoding/multiplexing unit 57.

The reversible encoding/multiplexing unit 57 has, for example, a run-length encoding unit and re-arrays quantized signals so that a 0 (zero) run will be as long as possible, by way of performing run-length coding. The encoded signal is multiplexed and transmitted as encoded picture signals over the transmission route.

Specifically, if three-stage spectrum splitting is used in place of two-stage splitting shown in FIG. 6, the quantized coefficients of the wavelet transform are grouped from band to band and arrayed in a matrix configuration. The wavelet transform coefficients of the respective groups disposed at the same spatial position are collected. This group of the coefficients is termed a coefficient tree.

The high frequency band signals in both the horizontal and vertical directions from the first stage spectrum splitting (corresponding to the output of, for example, the analysis vertical HPF $45_{VH}$), are equivalent to the wavelet transform coefficients of a group $HH_0$. The high frequency band signals from the first stage spectrum splitting, corresponding to the output of, for example, the analysis vertical LPF $45_{VL}$, are equivalent to the wavelet transform coefficients of a group $HL_0$, while the high frequency band signals from the first stage spectrum splitting, corresponding to the output of, for example, the analysis vertical LPF $44_{VH}$, are equivalent to the wavelet transform coefficients of a group $LH_0$. The high frequency band signals from the second stage spectrum splitting, corresponding to the output of, for example, the analysis vertical LPF $52_{VH}$, are equivalent to the wavelet transform coefficients of a group $HH_1$. The high frequency band signals from the second stage spectrum splitting, corresponding to the output of, for example, the analysis vertical LPF $52_{VL}$, are equivalent to the wavelet transform coefficients of a group $HL_1$, while the high frequency band signals from the second stage spectrum splitting, corresponding to the output of, for example, the analysis vertical LPF $51_{VH}$, are equivalent to the wavelet transform coefficients of a group $LH_1$.

Figure 9:
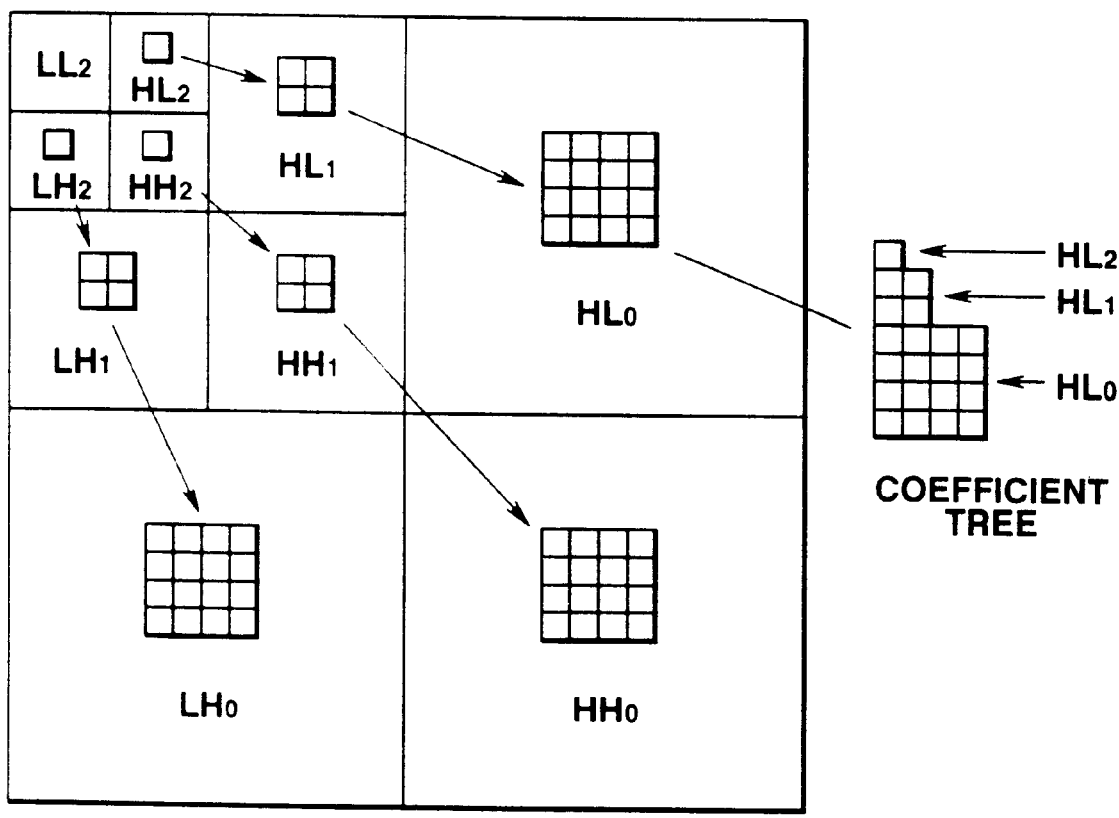
FIG. 9 illustrates a specified example of a coefficient tree for wavelet transform.
Figure 10:
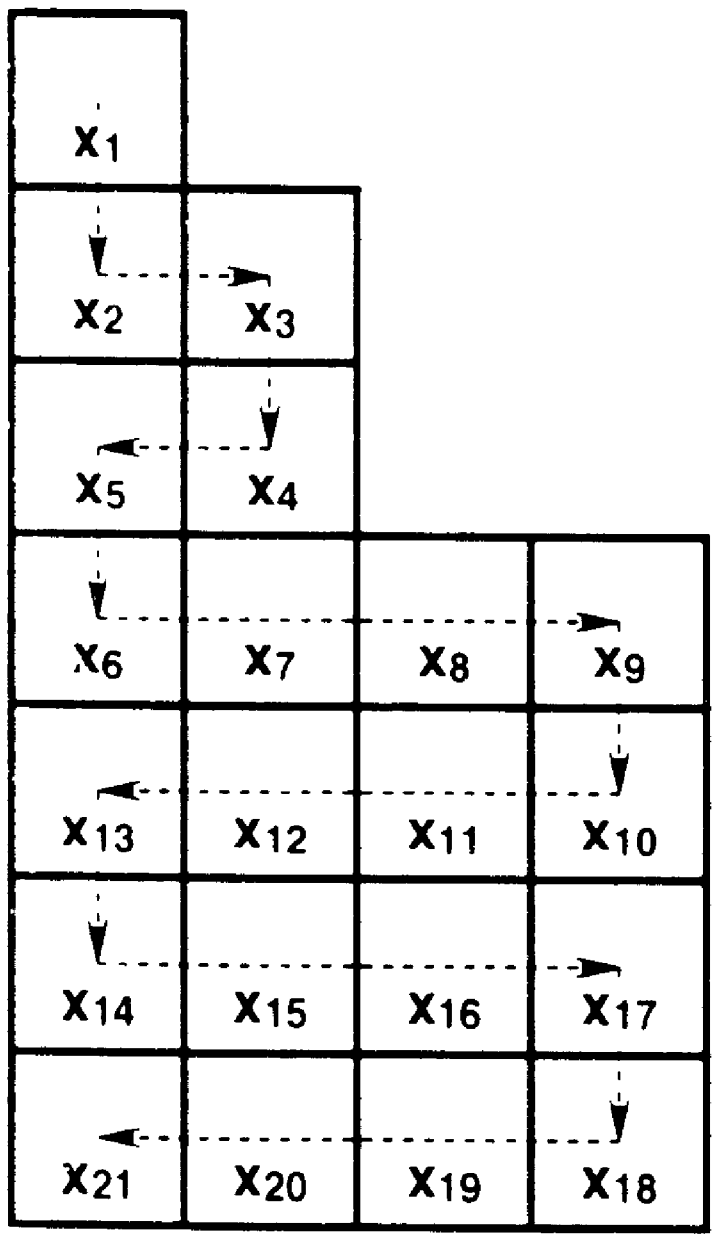
FIG. 10 illustrates a specified example of a sequence for run-length encoding of coefficients in wavelet transform.

The reversible encoding/multiplexing unit 57 collect the wavelet transform coefficients disposed in the same spatial position in the group $HL_2$, $HL_1$ and $HL_0$ to form a coefficient tree. Similarly, the reversible encoding/multiplexing unit collect the wavelet transform coefficients disposed in the same spatial position in the group $HH_2$, $HH_1$ and $HH_0$ to form a coefficient tree, while collecting the wavelet transform coefficients disposed in the same spatial position in the group $LH_2$, $LH_1$ and $LH_0$ to form another coefficient tree. The reversible encoding/multiplexing unit 57 then scans the wavelet transform coefficients in each coefficient tree so that the coefficients of the respective groups are sequential arrayed, as shown for example in FIG. 9, by way of performing run-length coding. Specifically, the wavelet coefficients with consecutive identical symbols are insignificant coefficients. If a given wavelet transform coefficient is insignificant, it is highly likely that the wavelet transform coefficient adjacent thereto is insignificant. Conversely, if a given wavelet transform coefficient is significant, it is highly likely that the wavelet transform coefficient adjacent thereto is significant. The run-length encoding is effective for a long concatenation of identical symbols. Therefore, the reversible encoding/multiplexing unit 57 scans the wavelet transform coefficients of the respective coefficient trees so that consecutive wavelet transform coefficients in a scanned string will be $x_1, x_2, x_3, x_4, x_5, x_6, \ldots$ as shown for example in FIG. 10 by way of performing run-length encoding. Thus the reversible encoding/multiplexing unit 57 can encode the wavelet transform coefficients efficiently.

The sub-band decoder embodying the present invention is now explained.

The present sub-band decoder includes a reversible decoding/demultiplexing unit 61 for decoding transmitted encoded picture signals, and seven dequantizers 62a to 62g, as shown in FIG. 7, since the present decoder is designed for processing two-dimensional picture signals.

The reversible decoding/demultiplexing unit 61 performs processing reversed from processing by the reversible encoding/multiplexing unit 57 of the sub-band encoding unit 40 on the encoded picture signals directly transmitted from the sub-band encoder 40 or reproduced from the recording medium for reproducing seven frequency band signals associated with output signals of the quantizers 56a to 56g in the sub-band encoder 40 for supplying these signals to the dequantizers 62a to 62g.

The dequantizers 62a to 62g own quantization steps corresponding to those owned by the quantizers 56a to 56g of the sub-band encoder 40, respectively, for dequantizing signals of respective frequency bands from the reversible decoding/demultiplexing unit 61.

Referring to FIG. 7, the present sub-band decoder includes, for second stage band synthesis, memories $63_L$, $63_H$, $64_L$, $64_H$ for temporarily storing dequantized signals from the quantizers 62a to 62d, and upsampling units $65_L$, $65_H$, $66_L$, $66_H$ for upsampling signals read out from the memories $63_L$, $63_H$, $64_L$, $64_H$. The sub-band decoder also includes second stage synthesis vertical LPF $67_{VL}$, synthesis vertical HPF $67_{VH}$, synthesis vertical LPF $68_{VL}$ and synthesis vertical HPF $68_{VH}$ for interpolating upsampled signals, and adders $69_L$, $69_H$ for summing the signals from the synthesis vertical LPF $67_{VL}$ to the synthesis vertical HPF $68_{VH}$. The sub-band decoder also includes upsampling units $70_L$, $70_H$ for upsampling output signals of the adders $69_L$, $69_H$, and second stage synthesis horizontal LPF $71_{HL}$ and synthesis horizontal HPF $71_{HH}$ for interpolating signals from the upsampling units $70_L$, $70_H$. The sub-band decoder further includes an adder 72 for adding signals from the synthesis horizontal LPF $71_{HL}$ and synthesis horizontal HPF $71_{HH}$.

The adder 72 outputs low frequency band signals which are associated with the output signal of the downsampling unit $46_L$ of the sub-band encoder 40 and the horizontal and vertical directions of which both belong to the low frequency band. The operation of the synthesis vertical LPF $67_{VL}$ to the synthesis horizontal HPF $71_{HH}$ of the second stage is similar to that of the synthesis LPF $24_L$ and the synthesis HPF $24_H$ shown in FIG. 5 and hence the detailed description of the circuits is not made for simplicity.

Meanwhile, the upsampling units $65_L$ to $66_H$ perform upsampling in the vertical direction of the picture and insert all-zero one-line signal between respective lines of the dequantized signals. The memories $63_L$ to $64_H$ are line memories for transiently storing signals of a necessary number of lines for up-sampling the signals, supplied as horizonal scanning of the picture proceeds, in the vertical direction of the picture.

Referring to FIG. 7, the present sub-band decoder includes, for first stage band synthesis, memories $74_L$, $74_H$, $75_L$, $75_H$ for storing signals from the adder 72 and dequantized signals from the quantizers 62a to 62d, and upsampling units $76_L$, $76_H$, $77_L$, $77_H$ for upsampling signals read out from the memories $74_L$ to $75_H$. The sub-band decoder also includes first stage synthesis vertical LPF $78_{VL}$, synthesis vertical HPF $78_{VH}$, synthesis vertical LPF $79_{VL}$ and synthesis vertical HPF $79_{VH}$ for interpolating upsampled signals, and adders $80_L$, $80_H$ for summing the signals from the synthesis vertical LPF $78_{VL}$ to the synthesis vertical HPF $79_{VH}$. The sub-band decoder also includes upsampling units $81_L$, $81_H$ for upsampling output signals of the adders $80_L$, $80_H$, and first stage synthesis horizontal LPF $82_{HL}$ and synthesis horizontal HPF $82_{HH}$ for interpolating signals from the upsampling units $81_L$, $81_H$. The sub-band decoder further includes an adder 83 for adding signals from the synthesis horizontal LPF $82_{HL}$ and synthesis horizontal HPF $82_{HH}$.

The first-stage adder 83 outputs a signal synthesized from low frequency band signals from the memories $74_L$ to $75_H$, associated with the output signals of the downsampling units $46_L$ to $47_H$ of the sub-band encoding unit 40 and the horizontal and vertical directions of which both belong to the low frequency band, high frequency band signals the horizontal and vertical directions of which belong to the low frequency band and to the high frequency band, respectively, high frequency band signals the horizontal and vertical directions of which belong to the high frequency band and to the low frequency band, respectively, and high frequency band signals the horizontal and vertical directions of which both belong to the high frequency band. The operation of the first stage synthesis vertical LPF $78_{VL}$ to the synthesis vertical LPF $82_{HH}$ is the same as that of the synthesis LPF $28_L$ and the synthesis HPF $28_H$ shown in FIG. 5 and hence the detailed description of the circuits is not made for simplicity. Meanwhile, the upsampling units $76_L$ to $77_H$ perform upsampling in the vertical direction of the picture and insert all-zero one-line signal between respective lines of the dequantized signals. The memories $74_L$ to $75_H$ are line memories for transiently storing signals of a necessary number of lines for up-sampling the signals in the vertical direction of the picture as these signals are supplied with the progress of horizonal picture scanning.

The LPFs and HPFs of the first stage can have the same filter tap coefficients. Specifically, the analysis horizontal HPF $41_{HL}$, analysis vertical LPF $44_{VL}$ and $45_{VL}$ use tap coefficients shown in table 1, while the analysis horizontal HPF $41_{HH}$, analysis vertical LPF $44_{VH}$ and $45_{VH}$ use tap coefficients shown in table 2. The analysis vertical LPF $48_{HL}$, vertical horizontal LPF $51_{VL}$ and $52_{VL}$ used for spectrum splitting of the second state use tap coefficients shown in table 3, while the analysis horizontal HPF $48_{HH}$, analysis vertical LPF $51_{VH}$ and $52_{VH}$ use tap coefficients shown in table 4.

It should be noted that representation for the first and second stages is based on the encoder side without being based on signal flow.

That is, according to the present invention, the number of taps of the final (n−1)th stage filter in the signal flow is set so as to be smaller than that of the final nth filter disposed next to the (n−1)th filter when decoding the signals encoded by the sub-band encoding, while the number of taps of the (n−2)st stage filter is set so as to be smaller than that of the (n−1)st stage filter. This prevents ringing from being produced over a wide range around the picture edge.

The present invention is not limited to the above-described illustrative embodiments. For example, although the number of times of spectrum splitting is two in the above-described embodiments, the number of stages may be increased to a larger valve, such as three or four, without departing from the scope of the invention.

What is claimed is:

1. A sub-band encoding method for splitting the frequency spectrum of an input signal into plural bands, encoding the signals of the respective bands and transmitting the encoded signal, comprising:
    a first step of splitting said input signal into a signal of a high frequency band and a signal of a low frequency band using a first-stage low-pass filter and a first-stage high-pass filter;
    a second step of downsampling signals of respective frequency bands obtained by said first step;
    a third step of splitting the frequency spectrum of the low frequency band signal downsampled by said second step, using recursively a pre-set low-pass filter and a high-pass filter, for generating signals of a plurality of frequency bands; and
    a fourth step of encoding the signals of respective frequency bands obtained by said second step and the third step;
    wherein the number of taps of a second-stage low-pass filter and a second-stage high-pass filter used in said third step is set so as to be smaller than the number of taps of the first-stage low-pass filter and the first-stage high-pass filter.

2. The sub-band encoding method as claimed in claim 1 wherein the number of taps of low-pass filters and high-pass filters of a third and following stages used in said third step is less than the number of taps of the second-stage low-pass and high-pass filters.

3. The sub-band encoding method as claimed in claim 2 wherein the low-pass and high-pass filters used in said first and third steps are linear phase filters.

4. The sub-band encoding method as claimed in claim 1 wherein the low-pass and high-pass filters used in said third step are filters for wavelet transform.

5. The sub-band encoding method as claimed in claim 1 wherein the fourth step includes a step of quantizing the signals of the respective frequency bands and a step of multiplexing the quantized signals of the respective frequency bands.

6. The sub-band encoding method as claimed in claim 1 wherein the input signal represents at least one of still and moving images.

7. A sub-band encoding method for splitting the frequency spectrum of an input signal into plural bands, encoding the signals of the respective bands and transmitting the encoded signal, comprising:
    a first step of splitting said input signal into a first signal of a high frequency band and a first signal of a low frequency band, using a first-stage low-pass filter and a first-stage high-pass filter;
    a second step of downsampling signals of respective frequency bands obtained by said first step;
    a third step of further splitting the signals of the low frequency band, downsampled by said second step, using a second low-pass filter and a second high-pass filter, into signals of two frequency bands, for generating a second signal of a low frequency band and a second signal of a high frequency band; and
    a fourth step of encoding the signals of the frequency bands obtained by said second and third steps;
    wherein the number of taps of the second low-pass filter and the second high-pass filter used in said third step is set so as to be smaller than the number of taps of the first low-pass filter and the first high-pass filter used in said first step.

8. The sub-band encoding method as claimed in claim 7 wherein the low-pass and high-pass filters used in said third step are filters for wavelet transform.

9. The sub-band encoding method as claimed in claim 7 wherein the input signal represents at least one of still and moving images.

10. A sub-band decoding method for decoding a subband encoded transmitted signal, comprising:
    a first step of decoding signals of respective frequency bands of the transmitted encoded signal;
    a second step of recursively synthesizing signals of the respective frequency bands decoded in said first step except a signal of the highest frequency band, using pre-set low-pass and high-pass filters, as the synthesized signals are upsampled, for generating signals of the low frequency band;
    a third step of upsampling the signals of the highest frequency band decoded by said first step for generating signals of the high frequency band; and
    a fourth step of synthesizing the signals of the low frequency band and the signals of the high frequency band for generating reproduced signals, using the last stage (stage n) low-pass and high-pass filters;
    wherein the number of taps of the (n−1)st stage low-pass and high-pass filters, among the low-pass and high-pass filters used in said second step, is set so as to be smaller than the number of taps of the last nth stage low-pass and high-pass filters used in said fourth step.

11. The sub-band decoding method as claimed in claim 10 wherein the number of taps of the low-pass and high-pass filters upstream of a (n−2)st stage used in said second step is not larger than the number of taps of the low-pass and high-pass filters of the (n−1)st stage.

12. The sub-band decoding method as claimed in claim 10 wherein the low-pass and high-pass filters of the first to the (n−1)st stage used in said second step are filters for wavelet transform.

13. The sub-band decoding method as claimed in claim 10 wherein the low-pass and high-pass filters used in said second and fourth steps are linear phase filters.

14. A sub-band decoding method for decoding a subband encoded transmitted signal, comprising:

a first step of decoding the signals of respective frequency bands of the transmitted encoded signal;

a second step of upsampling signals of the respective frequency bands decoded in said first step except the signal of the highest frequency band, and subsequently synthesizing the upsamples signals, using a first low-pass filter and a first high-pass filter, for generating signals of the low frequency band;

a third step of upsampling the signals of the highest frequency band obtained by said first step for generating signals of the high frequency band; and a fourth step of synthesizing the signals of the low frequency band and the signals of the high frequency band, using a second low-pass filter and a second high-pass filter, for generating reproduced signals;

wherein the number of taps of the first low-pass and high-pass filters used in said second step is set so as to be smaller than the number of taps of the second low-pass and high-pass filters used in said fourth step.

15. The sub-band decoding method as claimed in claim 14 wherein the second low-pass and high-pass filters used in said fourth step are filters for wavelet transform.

16. A sub-band encoding method for splitting the frequency spectrum of an input two-dimensional picture signal into plural bands, encoding the signals of the respective bands and transmitting the encoded signal, comprising:

a first step of band-splitting the input two-dimensional picture signal in each of horizontal and vertical directions, using a first low-pass filter and a first high-pass filter, for generating a first signal of a low frequency band lying in a low frequency range in both the horizontal and vertical directions and a first signal of a high frequency band lying in a high frequency range in the horizontal or in the vertical directions;

a second step of downsampling signals of respective frequency bands obtained by said first step;

a third step of splitting the first signal of the low frequency band downsampled in said second step in each of the horizontal and vertical directions, using a second low-pass filter and a second high-pass filter, for generating a second signal of the low frequency band lying in the low frequency range in both the horizontal and vertical directions and a second signal of the high frequency band lying in the low frequency range in the horizontal or in the vertical directions, and downsampling the signals of the respective frequency band; and a fourth step of encoding the signals of the respective frequency bands obtained in said second and third steps;

wherein the number of taps of the second low-pass and high-pass filters used in said third step is set so as to be smaller than the number of taps of the first low-pass and high-pass filters used in said first step.

17. The sub-band encoding method as claimed in claim 16 wherein the input two-dimensional picture signal represents at least one of still and moving images.

18. A sub-band decoding method for decoding a subband encoded transmitted picture signal, comprising:

a first step of decoding the signals of respective frequency bands of the transmitted encoded signal for generating plural decoded signals;

a second step of synthesizing the decoded signals of the respective frequency bands decoded in said first step except a signal of a high frequency band lying in a horizontal direction or in a vertical direction, using first low-pass and high-pass filters, as the synthesized signals are upsampled, for generating signals of a low frequency band in both the horizontal and vertical directions;

a third step of upsampling the decoded signals containing signals of the high frequency band obtained by said first step, for generating signals of the high frequency band; and a fourth step of synthesizing the signals of the low frequency band and the signals of the high frequency band using second low-pass and high-pass filters for generating reproduced signals;

wherein the number of taps of the first stage low-pass and high-pass filters, used in said second step, is set so as to be smaller than the number of taps of the second low-pass and high-pass filters used in said fourth step.

19. A sub-band encoding apparatus for splitting the frequency spectrum of an input two-dimensional picture signal into plural bands, encoding the signals of the respective bands and transmitting the encoded signal, comprising:

first means for splitting the input two-dimensional picture signal in each of horizontal and vertical directions using a first low-pass filter and a first high-pass filter, for generating a first signal of a low frequency band lying in a low frequency range in both the horizontal and vertical directions and a first signal of a high frequency band lying in the low frequency range in the horizontal or in the vertical directions;

second means for downsampling signals of respective frequency bands obtained by said first means;

third means for splitting the first signal of the low frequency band downsampled in said second means in each of the horizontal and vertical directions, using a second low-pass filter and a second high-pass filter, for generating a second signal of the low frequency band lying in the low frequency range in both the horizontal and vertical directions and a second signal of the high frequency band lying in the low frequency range in the horizontal or in the vertical directions, and downsampling the signals of the respective frequency bands; and fourth means for encoding the signals of the respective frequency bands obtained in said second and third means;

wherein the number of taps of the second low-pass and high-pass filters used in said third means is set so as to be smaller than the number of taps of the first low-pass and high-pass filters used in said first means.

20. The sub-band encoding apparatus as claimed in claim 19 wherein the input two-dimensional picture signal represents at least one of still and moving images.

21. A sub-band decoding apparatus for decoding a sub-band encoded transmitted picture signal, comprising:

first means for decoding the signals of respective frequency bands of the transmitted encoded signal for generating plural decoded signals;

second means for synthesizing the decoded signals of the respective frequency bands decoded in said first means except a signal of a high frequency band, in a horizontal direction or in a vertical direction, using first low-pass and high-pass filters, as the synthesized signals are upsampled, for generating signals of a low frequency band lying in the low frequency range in both the horizontal and vertical directions;

third means for upsampling the decoded signals containing signals of the high frequency band obtained by said first means for generating signals of the high frequency band; and fourth means for synthesizing the signals of the low frequency band and the signals of the high frequency band, using second low-pass and high-pass filters, for generating reproduced signals;

wherein the number of taps of the first low-pass and high-pass filters, used in said second means, is set so as to be smaller than the number of taps of the second low-pass and highpass filters used in said fourth means.

22. A sub-band encoding/decoding apparatus for splitting the frequency spectrum of an input two-dimensional picture signal into plural bands, encoding the signals of the respective bands, transmitting the encoded signal, and decoding the transmitted encoded picture signals, comprising:

first means for splitting the input two-dimensional picture signal in each of horizontal and vertical directions, using a first low-pass filter and a first high-pass filter, for generating a first signal of a low frequency band lying in a low frequency range in both the horizontal and vertical directions and a first signal of a high frequency band lying in a high frequency range in the horizontal or in the vertical directions;

second means for downsampling signals of respective frequency bands obtained by said first means;

third means for splitting the first signal of the low frequency band downsampled in said second means in each of the horizontal and vertical directions, using a second low-pass filter and a second high-pass filter, for generating a second signal of the low frequency band lying in the low frequency range in both the horizontal and vertical directions, and a second signal of the high frequency band lying in the high frequency range in the horizontal or in the vertical directions, and downsampling the signals of the respective frequency bands;

fourth means for encoding the signals of the respective frequency bands obtained in said second and third means;

fifth means for decoding the signals of respective frequency bands of the transmitted encoded signal for generating plural decoded signals;

sixth means for synthesizing the decoded signals of the respective frequency bands generated in said fifth step except a signal of the high frequency band, in the horizontal direction or in the vertical direction, using third low-pass and high-pass filters, as the synthesized signals are upsampled, for generating signals of the low frequency band in both the horizontal and vertical directions;

seventh means for upsampling the decoded signals containing signals of the high frequency band generated by said fifth step, for generating signals of the high frequency band; and eighth means for synthesizing the signals of the low frequency band and the signals of the high frequency band, using fourth low-pass and high-pass filters, for generating reproduced signals;

wherein the number of taps of the second low-pass and high-pass filters used in said third means is set so as to be smaller than the number of taps of the first low-pass and high-pass filters used in said first means and wherein the number of taps of the third low-pass and high-pass filters, used in said sixth means, is set so as to be smaller than the number of taps of the fourth low-pass and high-pass filters used in said eighth step.

23. The sub-band encoding/decoding apparatus as claimed in claim 22 wherein, with transfer functions of the first to fourth filters of $H_0(z)$, $H_1(z)$, $F_0(z)$ and $F_1(z)$, the transfer functions satisfy the following relation:

$$H_0(-z)F_0(z)+H_1(-z)F_1(z)=0$$

$$H_0(z)F_0(z)+H_1(z)F_1(z)=2z^{-L}$$

wherein L is an integer.

24. The sub-band encoding apparatus as claimed in claim 22 wherein the input two-dimensional picture signal represents at least one of still and moving images.

* * * * *